United States Patent
Weaver et al.

(10) Patent No.: US 7,206,573 B1
(45) Date of Patent: Apr. 17, 2007

(54) METHOD AND SYSTEM FOR FACILITATING DETERMINATION OF CALL-DROP LOCATIONS IN A WIRELESS NETWORK

(75) Inventors: Farni Weaver, Spring Hill, KS (US); Shiva Narayanabhatla, Overland Park, KS (US); Piyush Jethwa, Overland Park, KS (US); Jesse Grindeland, Olathe, KS (US); Wen Xue, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 191 days.

(21) Appl. No.: 10/658,353

(22) Filed: Sep. 9, 2003

(51) Int. Cl.
*H04Q 7/20* (2006.01)

(52) U.S. Cl. .................. 455/423; 455/424; 455/455; 455/456.1

(58) Field of Classification Search ............ 455/67.11, 455/423, 446, 450, 452.2, 456.1–456.6, 404.2, 455/436, 438, 440, 560, 424; 370/344, 331, 370/338, 352
See application file for complete search history.

(56) References Cited

U.S. PATENT DOCUMENTS

| | | | |
|---|---|---|---|
| 6,343,216 B1* | 1/2002 | Kim et al. | 455/450 |
| 6,459,695 B1* | 10/2002 | Schmitt | 370/344 |
| 6,714,525 B1* | 3/2004 | Mansour | 370/335 |
| 6,970,721 B1* | 11/2005 | Gnesda et al. | 455/424 |
| 2002/0042260 A1* | 4/2002 | Saucedo et al. | 455/404 |
| 2002/0068586 A1* | 6/2002 | Chun et al. | 455/458 |
| 2002/0090947 A1* | 7/2002 | Brooks et al. | 455/436 |
| 2002/0119787 A1* | 8/2002 | Hunzinger | 455/455 |
| 2004/0203607 A1* | 10/2004 | Satapathy | 455/412.1 |
| 2004/0203717 A1* | 10/2004 | Wingrowicz et al. | 455/456.1 |
| 2004/0203855 A1* | 10/2004 | Veerasamy et al. | 455/456.1 |
| 2005/0054339 A1* | 3/2005 | Merritt | 455/423 |
| 2005/0064844 A1* | 3/2005 | McAvoy et al. | 455/456.1 |
| 2005/0064879 A1* | 3/2005 | McAvoy | 455/456.1 |
| 2006/0094430 A1* | 5/2006 | Shah | 455/436 |

OTHER PUBLICATIONS

U.S. Appl. No. 10/144,544, filed May 13, 2002, McLaughlin.
"Empower Geographics / One Call", www.empowergeo.com/pages/onecall.htm, printed Oct. 15, 2001, 2 pages.
Alan Grodon, "Network Management: Creating a Virtual Presence", CED Magazine, www.cedmagazine.com/ced/9707/9707b.htm, Jul. 1997, printed Oct. 15, 2001, 7 pages.

* cited by examiner

*Primary Examiner*—Jean Gelin
*Assistant Examiner*—Kamran Afshar (57) ABSTRACT

A method and system for automatically providing to a network entity in a wireless network, a location of a mobile station where a call is dropped (i.e., a call-drop location). The mobile station or base station may determine that a call in which the mobile station was engaged has been dropped. In response to determining that a call has been dropped, the mobile station or base station may obtain the location of the mobile station. The call-drop location can be used to identify those areas of the wireless network needing improved radio coverage.

8 Claims, 6 Drawing Sheets

METHOD AND SYSTEM FOR FACILITATING DETERMINATION OF CALL-DROP LOCATIONS IN A WIRELESS NETWORK

BACKGROUND

1. Field of the Invention

The present invention relates to wireless communication systems and, more particularly, to a method and system for facilitating determination of call-drop locations in a wireless network.

2. Description of Related Art

A wireless network is divided geographically into a number of cells, each defined by a radio frequency (RF) radiation pattern from a respective base transceiver station (BTS) antenna. BTS antennae in the cells are in turn coupled to a base station controller (BSC). The BSC may be coupled to a mobile switching center (MSC) and a packet data serving node (PDSN). The MSC and PDSN may facilitate communication with a telecommunication network such as a public switched telephone network (PSTN) and an Internet protocol (IP) network, respectively.

A mobile station, for example, a cellular telephone, a pager, or a portable computer with wireless modem, communicates via an RF air interface with a BTS antenna of the cell in which the mobile station is positioned. Consequently, a communication path is established between the mobile station and the telecommunication network, via the RF air interface, BTS, BSC, MSC and/or PDSN. Such a communication may be referred to as a "call," whether the communication is a traditional voice call or an active data session.

Changes in city and landscape topology can substantially affect operation of the wireless network. For instance, the radiation pattern of a cell site may change drastically as buildings and trees rise or fall in and around the cell site. The change in radiation pattern may cause the strength of signals that the mobile station receives from the BTS to vary. In addition, the strength of signals that the BTS receives from the mobile station can vary.

When a mobile station is actively engaged in a call, if the strength of the signal received by the mobile station or the BTS becomes too low, then the call between the BTS and the mobile station will be effectively cut off. The cut-off results in the call between the base station and the mobile station being "dropped."

SUMMARY

An exemplary embodiment of the present invention may include a mechanism for determining a call-drop location. The mobile station or base station may determine that a call in which the mobile station was engaged has been dropped. In response to determining that the call has been dropped, the mobile station or base station may obtain the location of the mobile station (i.e., a call drop location). The call-drop location can be used to identify those areas of the wireless network needing improved radio coverage.

A mechanism for determining the call-drop location may be handset-based or network-based. If the mechanism is handset-based, then the mobile station may determine that a call-drop event occurred. In turn, the mobile station may determine the call-drop location, for example, using a global positioning system (GPS) receiver on the mobile station. When the mobile station acquires connectivity with the base station, the mobile station may send a message to a network entity over the air interface. The message may identify the call-drop location. The call-drop location may be geographic coordinates or some other indication of where the call was dropped.

Alternatively, if the mechanism is network-based, then the base station may determine that a call drop event occurred. In turn, the base station may cause position determining equipment (PDE) in the wireless network to determine the location of the mobile station. The PDE may return back to the mobile station a call drop location. Again, the call-drop location may be geographic coordinates or some other indication of where the call was dropped.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
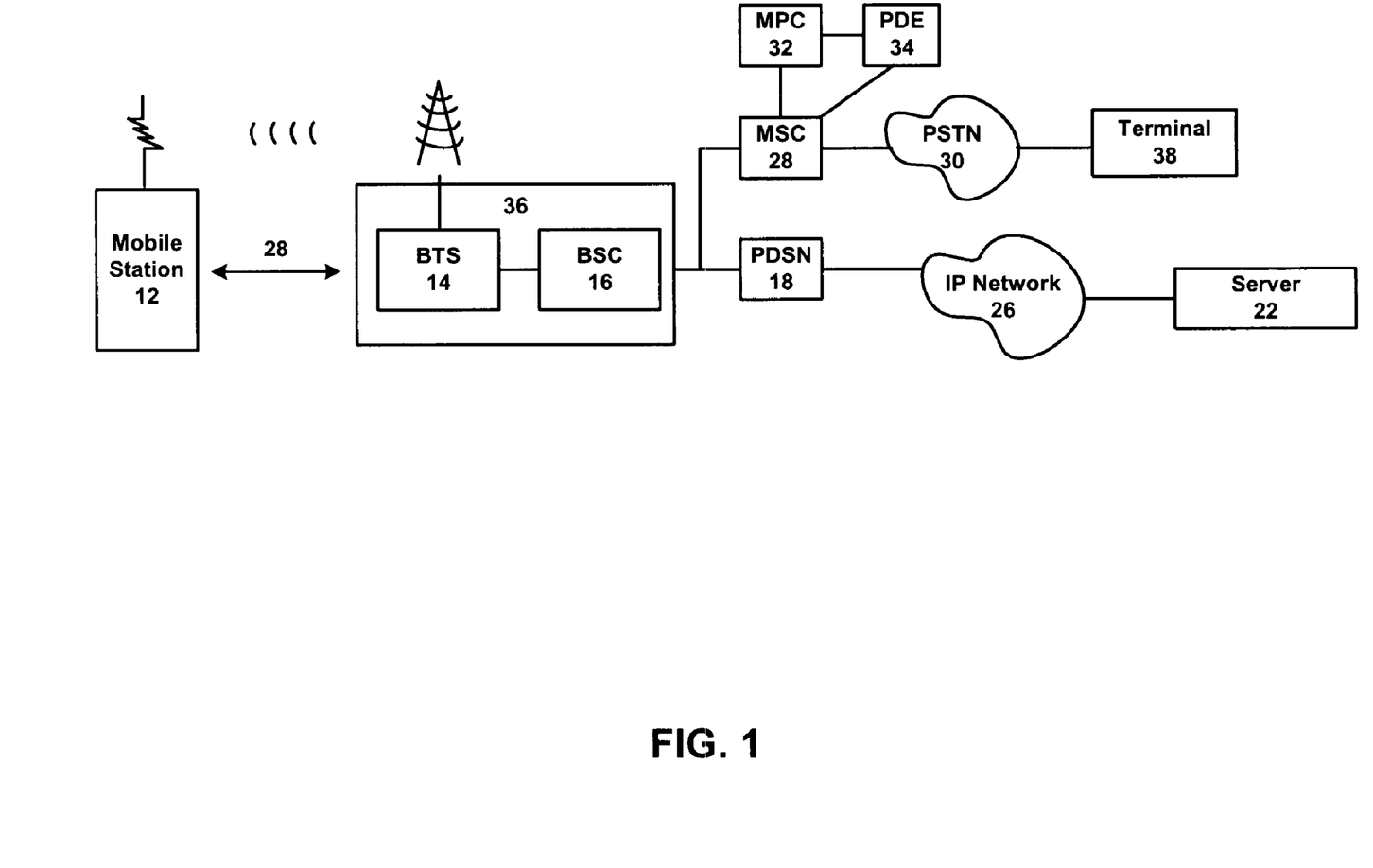
FIG. 1 is a block diagram of a wireless network.

FIG. 1 is a block diagram of a wireless network in which exemplary embodiments of the present invention may be employed. It should be understood that this and other arrangements and processes described herein are set forth for purposes of example only, and other arrangements and elements, for example, machines, interfaces, functions, orders of elements, etc., can be added or used instead and some elements may be omitted altogether. Further, those skilled in the art will appreciate that many of the elements described herein are functional entities that may be implemented as discrete components or in conjunction with other components, in any suitable combination and location. Still further, the various functions described herein may be carried out by logic defined by hardware or by computer instructions, for example, software or firmware, stored in memory and executable by a processor. Provided with the present disclosure, those skilled in the art can readily design the hardware or prepare the computer instructions necessary to perform the various functions.

The wireless network may include a mobile station 12. The mobile station 12 may be a wireless device such as a cellular phone, a pager, or a portable computer with wireless modem. Indeed, the mobile station 12 could take a variety of forms now known to those skilled in the art or later developed by those skilled in the art.

Additionally, the wireless network may include a radio access network. The radio access network may facilitate transmission and reception of signals with the mobile station 12, over an air interface 28. By way of example, the radio access network may include a BTS 14 and BSC 16 arranged to communicate with the mobile station 12 over the air interface 28. The BTS 14 and BSC 16 combination may be collectively referred to as a base station 36. The base station 36 may produce a radiation pattern that defines a coverage area of a cell site.

The base station 36 may be coupled to an MSC 28 and a PDSN 18. The MSC 28 may be, in turn, coupled to a PSTN 30 while the PDSN 18 may be coupled to an IP network 26. As one skilled in the art will appreciate, the base station 36 may be coupled to other network devices in addition to those described herein. The PDSN 18 may route packets between the mobile station 12 and entities coupled to the IP network 26. The MSC 28 may switch calls between the mobile station 12 and a terminal 38 on the PSTN 30, such as a landline telephone.

The MSC 28 may, in turn, be coupled to a mobile positioning center (MPC) 32 and position determining equipment (PDE) 34. The MPC 32 and PDE 34 may facilitate determining the location of any mobile station, for example. Additionally, a server 22 may be coupled to the IP network 26. The server 22 may have a processor, memory, and computer instructions stored in the memory and executable by the processor to provide various call-drop location services. The services provided by the server 22 will be described in more detail below.

Figure 2:
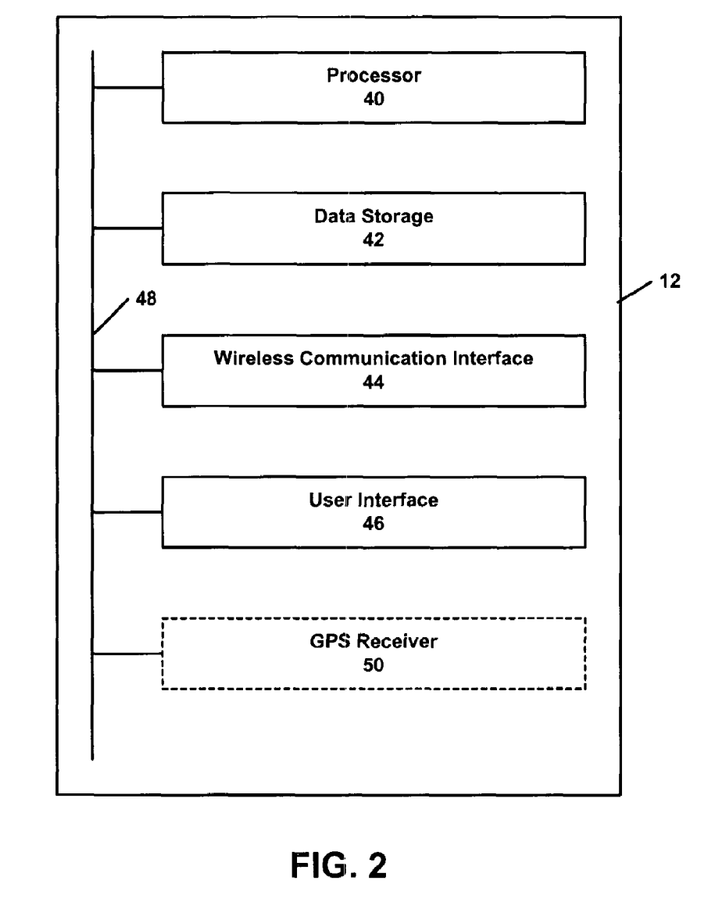
FIG. 2 is a block diagram of a mobile station.

FIG. 2 is a block diagram of a mobile station 12. As illustrated, the mobile station 12 may include a processor 40, data storage 42, a wireless communication interface 44, and a user interface 46, coupled to bus 48. In the exemplary embodiment, the data storage 42 may hold computer instructions executable by the processor 40. The wireless communication interface 44 may include a suitable antenna and transceiver circuitry to facilitate communication over the air interface 28 with the base station 36. The user interface 46 facilitates interaction with a user of the mobile station 12. As such, user interface 46 may include an input mechanism (a microphone, video camera and/or keypad, for example) and an output mechanism (audio speaker and/or video display, for example).

Optionally, the mobile station 12 may have a GPS receiver 50. The GPS receiver 50 may also be coupled to the bus 48. For example, the GPS receiver 50 may be a GPS 1™ receiver manufactured by Qualcomm™ of San Diego, Calif. The GPS receiver 50 typically measures arrival time of signals transmitted from a group of satellites. From the arrival time of signals, the GPS receiver 50 may determine the location of the mobile station 12. The GPS receiver 50 outputs the location of the mobile station 12 over the bus 48. The location of the mobile station 12 may be identified as geographic coordinates such as latitude and longitude coordinates, but other arrangements are also possible.

Figure 3:
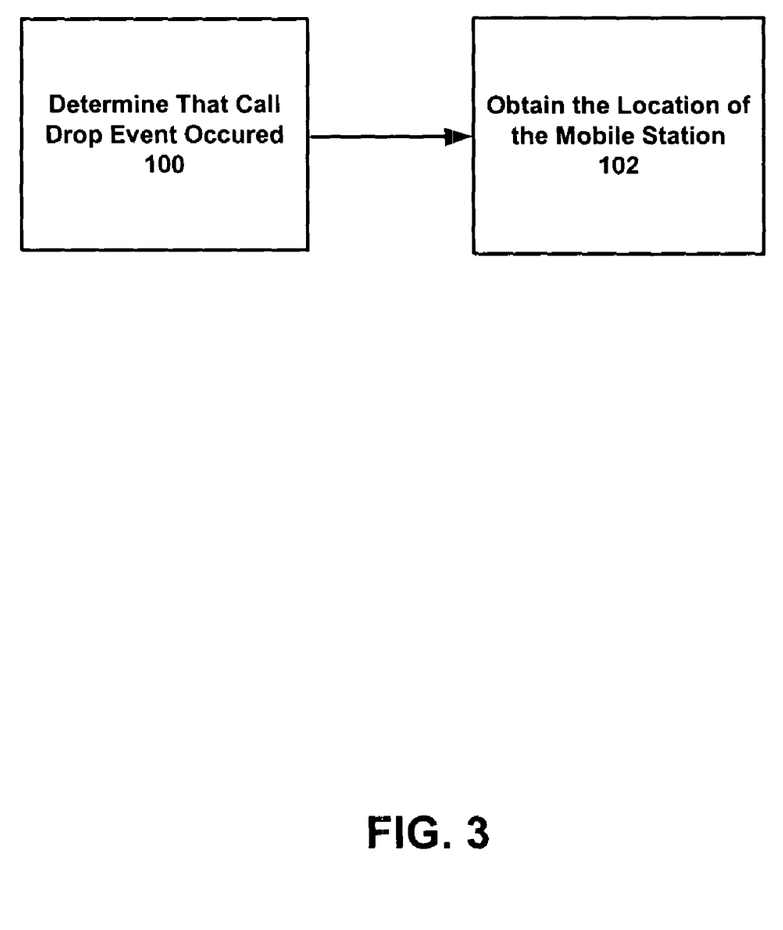
FIG. 3 is a flow chart that generally depicts functions in accordance with exemplary embodiments of the present invention.

FIG. 3 is a flow chart that illustrates functions performed by the mobile station 12 and/or a base station 36, in accordance with exemplary embodiments of the present invention. At step 100, the mobile station 12 or the base station 36 may determine that a call in which the mobile station 12 was engaged has been dropped (i.e., that a call-drop event has occurred). In response to determining the call drop event, at step 102, the mobile station 12 or the base station 36 may obtain the location of the mobile station 12. The location of the mobile station 12 may be indicative of a call-drop location.

The location of the mobile station 12 may be precisely the call-drop location, when, for instance, the mobile station 12 did not move from a time when a call-drop event was detected and the location of the mobile station 12 is determined. Alternatively, the location of the mobile station 12 may be "close", i.e., an estimate, to the call-drop location when, for instance, the mobile station 12 was moving between the time when the call-drop event was detected and when the location of the mobile station 12 is determined.

The mechanism for determining the location of the mobile station 12, and thus the call drop location, may be handset-based or network-based. If the mechanism is handset-based, then the mobile station 12 may identify a call-drop location. For example, the mobile station 12 may obtain the call drop location from the GPS receiver 50. Alternatively, if the mechanism is network-based, then base station 36 may cause the PDE 34 to identify the call-drop location, as described in more detail below. In both cases, however, the call-drop location may be geographic coordinates or some other indication of where a call was dropped.

Figure 4:
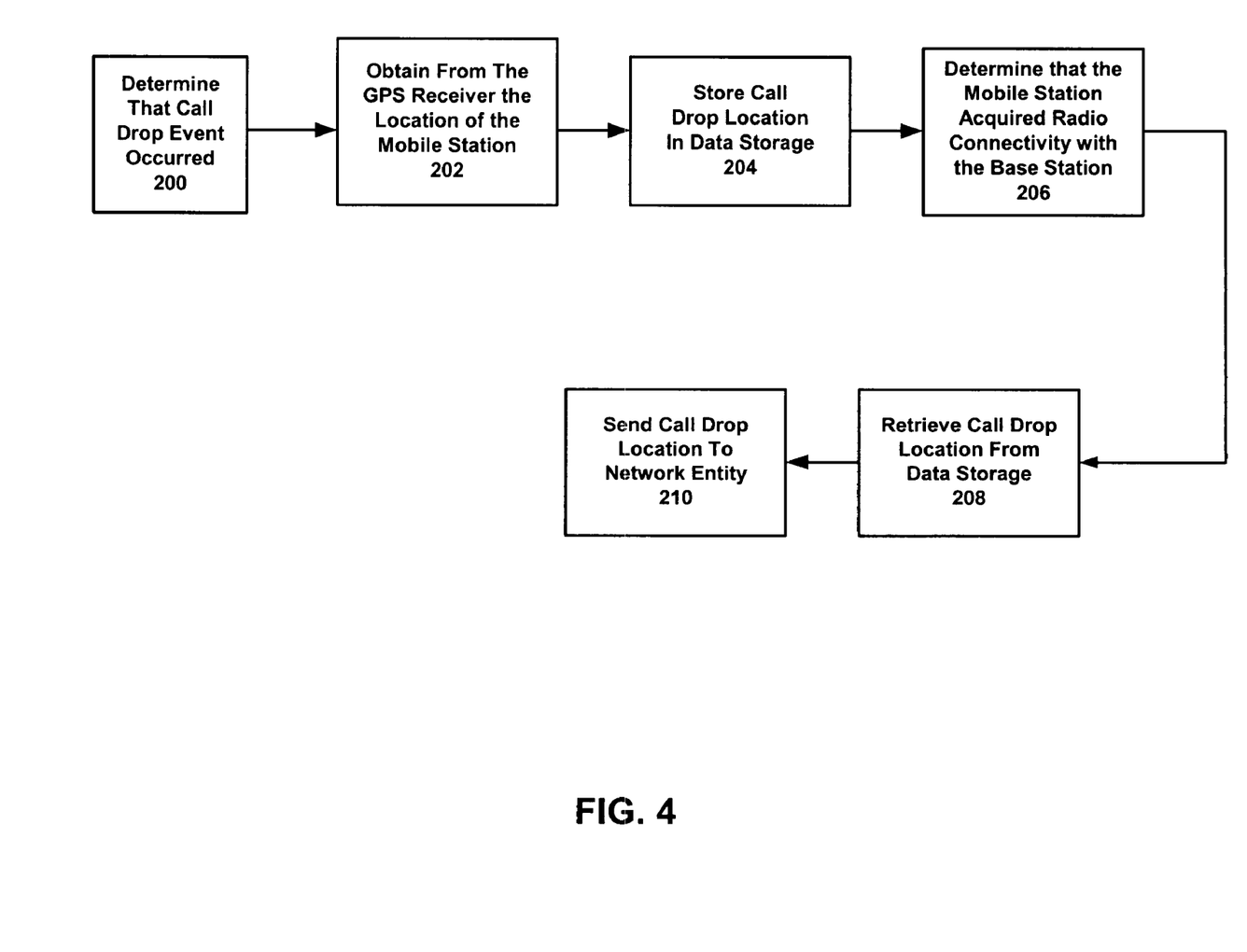
FIG. 4 is a flow chart that depicts functions performed by the mobile station when the mechanism for determining the call-drop location is handset-based.

FIG. 4 is a flow chart depicting, in more detail, exemplary functions performed by the mobile station 12, when the mechanism for determining location of the mobile station is handset-based.

During normal operations, the mobile station 12 may be engaged in a call. The call may be a voice call for exchanging voice traffic or a data session (active or idle) for exchanging data traffic. The voice traffic may represent voice communications, as produced, for instance, by a voice coder (vocoder). On the other hand, the data traffic may represent data, for example, session initiation protocol (SIP) messages, short message service (SMS) messages, hypertext transfer protocol (HTTP) messages, wireless access protocol (WAP) messages, or some other type of message.

Under some circumstances while the mobile station 12 is engaged in the voice call or the data session, communication with the mobile station 12 may be cut-off and the call may be dropped. The communication with the mobile station 12 may be cut-off due to the mobile station 12 entering an area with bad coverage. The bad coverage may be due to interference over the air interface fading or an inability for a base station to hand-off a call, for example.

At step 200, the mobile station 12 may determine whether a call-drop event has occurred. The mobile station 12 may determine in a variety of ways that a call-drop event occurs. For example, the mobile station 12 may continuously monitor quality of the frames that it receives from the base station 36 on a forward traffic channel (FTCH). The FTCH may define a communication path from the base station 36 to the mobile station 12 over the air interface 28. The mobile station 12 may determine that it has received during the call, a duration of bad frames from the base station 36. The bad frames may be frames that have at least one bit in error. The mobile station 12 may compare the duration of bad frames to a threshold level. The threshold level may define a certain duration of frames indicative of a call-drop event, e.g., 20 frames. If the duration is below the threshold level, then the mobile station 12 may determine that a call-drop event has not occurred. If the duration is above the threshold level, then the mobile station 12 may determine that a call-drop event occurred.

Alternatively, the mobile station 12 may determine that it has received during the call, a duration of bad frames from the base station 36. The mobile station 12, however, might not determine that a call-drop event occurred if a duration of good frames, i.e., frames not in error, is received within a predefined period of time after receiving the duration of bad frames. If a duration of good frames is received within the predefined period of time after receiving the duration of bad frames, then the mobile station 12 may determine that a call-drop event has not occurred. On the other hand, if a duration of good frames is not received within the predefined period of time after receiving the duration of bad frames, then the mobile station 12 may determine that a call-drop event has occurred.

Still alternatively, the call may be dropped because a first cell site handling a call is unable to hand the call off to a second cell site. The mobile station 12 may be moving from one cell site, e.g., covered by a first base station, to a second cell site, e.g., covered by a second base station. Typically, the first base station would hand off the call to the second base station when the mobile station 12 is within the range of the second cell site and out of range of the first cell site. The first base station might not be able to hand the call off to the second cell site because the second cell site is already overloaded with calls, and therefore cannot support the call being handed off. The mobile station 12 will detect that it lost communication with the base station, i.e., the mobile station 12 is not receiving any signals from the base station 36. The loss of communication is indicative of a call-drop event.

Other arrangements are also possible for the mobile station 12 to determine that a call drop event has occurred. The methodologies described above are exemplary in nature and should not limit how the mobile station 12 determines that a call drop event has occurred. Further, a call-drop event is distinguishable from a normal cessation of a call where, for instance, the user of the mobile station 12 presses an END button on the mobile station 12 or the mobile station is determined to be idle and the call is terminated, for instance.

In response to determining a call-drop event, at step 202, the mobile station 12 may obtain its location. For example, the processor 40 of the mobile station may execute computer instructions stored in the data storage 42 that causes the GPS receiver 50 to provide the location of the mobile station 12. The location of the mobile station may be where the call was dropped, i.e., a call-drop location. The call-drop location may take the form of geographic coordinates, for example, latitude and longitude coordinates. The call-drop location may take other forms known to those skilled in the art.

At step 204, the mobile station 12 may store the call-drop location in data storage 42. At step 206, the mobile station 12 may determine whether it has acquired radio connectivity with the base station 36. The acquisition of radio connectivity may take the form of the base station 36 providing to the mobile station 12 access to a particular type of channel. The particular type may be an access channel, an enhanced access channel, or a traffic channel as described below. The exemplary embodiments of the present invention, however, should not be limited by how the mobile station 12 acquires radio connectivity with the base station 36.

In one form, the acquisition of radio connectivity may take the form of the base station 36 making an access channel available to the mobile station 12. According to industry standards such as IS-2000, the access channel is a communication path from the mobile station 12 to the base station 36. The mobile station 12 may monitor an air interface paging channel to determine whether it has acquired radio connectivity with the base station 36. The paging channel is a communication path from the base station 36 to the mobile station 12. At some point, the base station 36 may make the access channel available to the mobile station 12. For instance, the base station 36 may define over the paging channel a frequency and a modulation scheme for the access channel. If the mobile station transmits signals at the frequency and modulation scheme, then the base station 36 would receive the signals over the access channel. Thus, the mobile station 12 acquires connectivity with the base station 36.

In another form, the acquisition of radio connectivity may take the form of the base station 36 making an enhanced access channel available to the mobile station 12. According to industry standards such as IS-2000, the enhanced access channel is a communication path from the mobile station 12 to the base station 36. The enhanced access channel is a robust channel, less prone to errors, as compared to the access channel. The mobile station 12 may monitor an air interface paging channel to determine whether it has acquired radio connectivity with the base station 36. The paging channel is a communication path from the base station 36 to the mobile station 12. At some point, the base station 36 may make the enhanced access channel available to the mobile station 12. For instance, the base station 36 may define over the paging channel a frequency and a modulation scheme for the enhanced access channel. If the mobile station transmits signals at the frequency and modulation scheme, then the base station 36 would receive the signals over the enhanced access channel. Thus, the mobile station 12 acquires connectivity with the base station 36.

In still another form, the radio connectivity may take the form of the base station 36 making available to the mobile station 36 a traffic channel. According to industry standards such as IS-2000, a reverse traffic channel (RTCH) is a channel from the mobile station 12 to the base station 36 that carries voice traffic or data traffic generated by a user of the mobile station 12. With the acquisition of an access channel, the mobile station 12 may use the access channel to send an initiation request message to the MSC 28. Applying industry standards such as IS-2000, the initiation request message may include a "packet data" service option attribute that characterizes requested communication as packet-data communication. The MSC 28 may detect the packet data service option attribute when the MSC 28 receives the initiation request and responsively send the message back to the base station 36 for handling. Using the paging channel, the base station 36 may, in turn, make available to the mobile station 12 an RTCH. For instance, the base station may define over the paging channel a frequency and a modulation scheme for the RTCH. If the mobile station transmits signals at the frequency and modulation scheme, then the base station 36 would receive the signals over the RTCH. Thus, the mobile station 12 acquires connectivity with the base station 36.

At step 208, when the mobile station 12 acquires radio connectivity with the base station 36, the mobile station 12 may retrieve the call-drop location from the data storage 50. At step 210, the mobile station 12 may send a message to the base station 36 over the air interface 28 and to the server 22. The message may define the call-drop location and take a variety of forms. For example, the message may be a WAP message, HTTP, SIP message, SMS message, but other arrangements are also possible. The server 22 may identify from the message the call-drop location.

The message may be sent through the access channel, the enhanced access channel or the traffic channel via the air interface 28 and to the server 22. As one skilled in the art will appreciate, however, the mobile station 12 may send the message through other channels. The exemplary embodiment should not be limited by the channel by which the message is sent to the server 22. Additionally, the mobile station 12 may request that the server 22 send an acknowledgment back to the mobile station 12 when the message is received. For instance, the mobile station 12 may provide an indication in the message sent to the server 22 that indicates to the server 22 to send an acknowledgement back to the mobile station 12. Other arrangements are also possible.

The server 22 may extract the call drop location from the message and log the call-drop location in memory to thereby produce a summary or rollup table that effectively lists all of the areas having a dropped-call count of more than some predefined level. Call-drop areas are areas of the wireless network that have exhibited a high incidence of call-drops. The location of the call-drop areas can be used to identify those areas of the wireless network needing improved radio coverage. The server 22 may use the call-drop location other ways as well consistent with the exemplary embodiment of the present invention.

Figure 5:
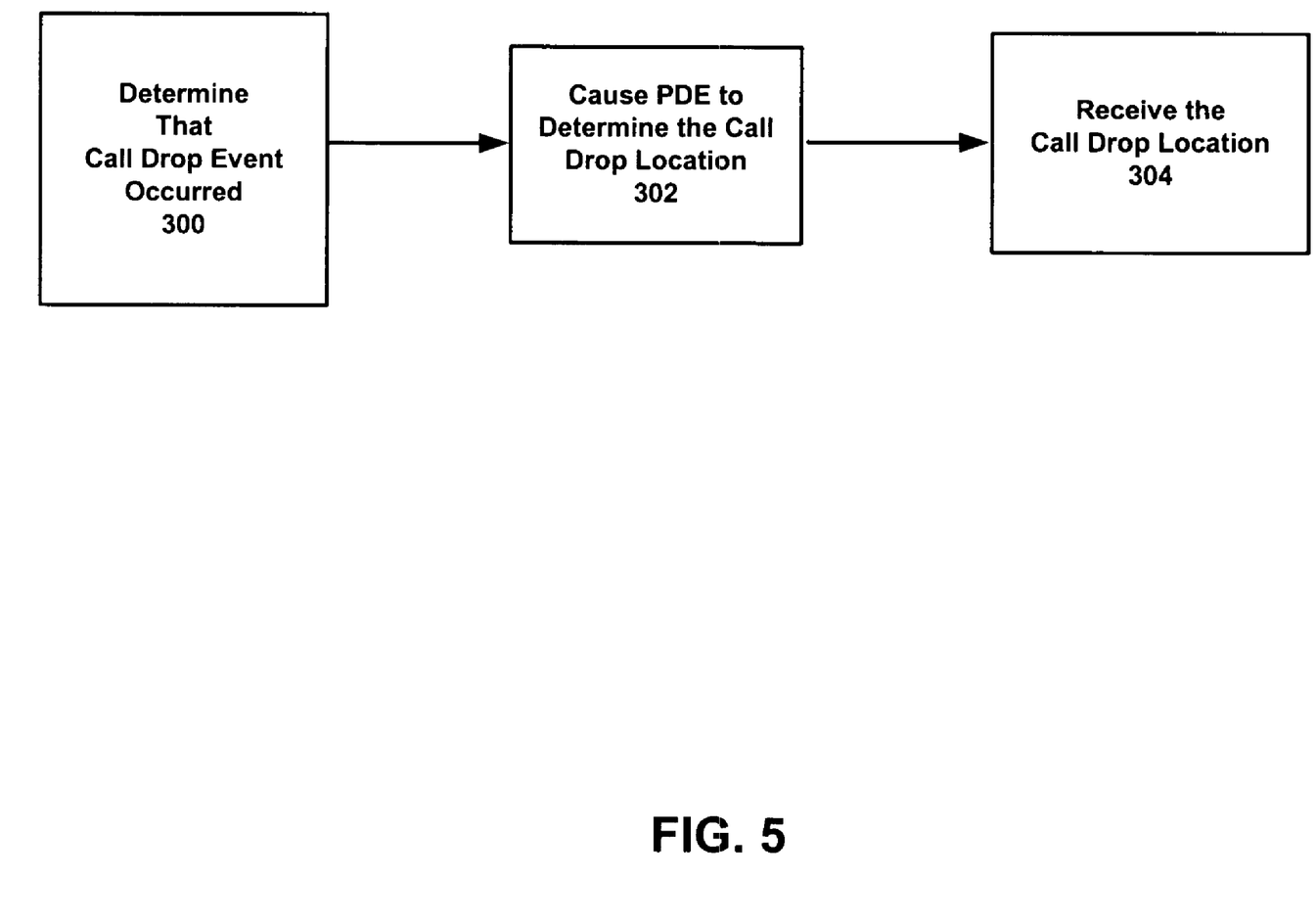
FIG. 5 is a flow chart that depicts functions performed by the base station when the mechanism for determining the call-drop location is network-based.

Instead of the mobile station 12 determining the location of the mobile station 12 when a call-drop event occurs, a network entity may determine the location of the mobile station 12. FIG. 5 is a flow chart depicting, in more detail, exemplary functions performed by the base station 36, when the mechanism for determining the location of the mobile station 12 is network-based.

As above, the mobile station 12 may be engaged in a call. The call may be a voice call or an active data session. Under some circumstances, while the mobile station 12 is engaged in the voice call or the active data session, communications with the mobile station 12 may be cut-off and the call may be dropped. At step 300, the base station 36 may determine that a call-drop event has occurred. For example, the base station 36 may determine that a duration of bad frames has been received from the mobile station 12. The duration of bad frames may be determined in the manner described above with respect to at step 200 of FIG. 4, but with respect to traffic received on a RTCH, rather than on a FTCH. The RTCH defines a communication path from the mobile station 12 to the base station 36. Alternatively, a call-drop may occur because the base station 36 cannot hand-off a call to another cell site. The base station 36 might not be able to hand-off a call to another cell site because the other cell site is overloaded with calls. As a result, the base station 36 will drop the call.

The base station 36 may determine that a call-drop event has occurred in a number of other ways as well. The exemplary embodiments of the present invention should not be limited to how the base station 36 determines whether a call-drop event occurred.

At step 302, the base station may cause the PDE 34 to determine the call-drop location. The location of the mobile station 12, as determined by the PDE 34, may be precisely the call-drop location, when, for instance, the mobile station 12 did not move from a time when a call-drop event was detected and the location of the mobile station 12 is determined. Alternatively, the location of the mobile station 12 may be "close", i.e., an estimate, to the call-drop location when, for instance, the mobile station 12 was moving between the time when the call-drop event was detected and when the PDE 34 identifies the location of the mobile station 12.

At step 304, the base station may receive from the PDE 34 the call-drop location. The base station 36 may log the call-drop location to thereby produce a summary or rollup table that effectively lists all of the areas having a dropped-call count of more than some predefined level. The location of the call-drop areas can be used to identify those areas of the wireless network needing improved radio coverage. The base station 36 may use the call-drop location in other ways as well consistent with the exemplary embodiment of the present invention.

Figure 6:
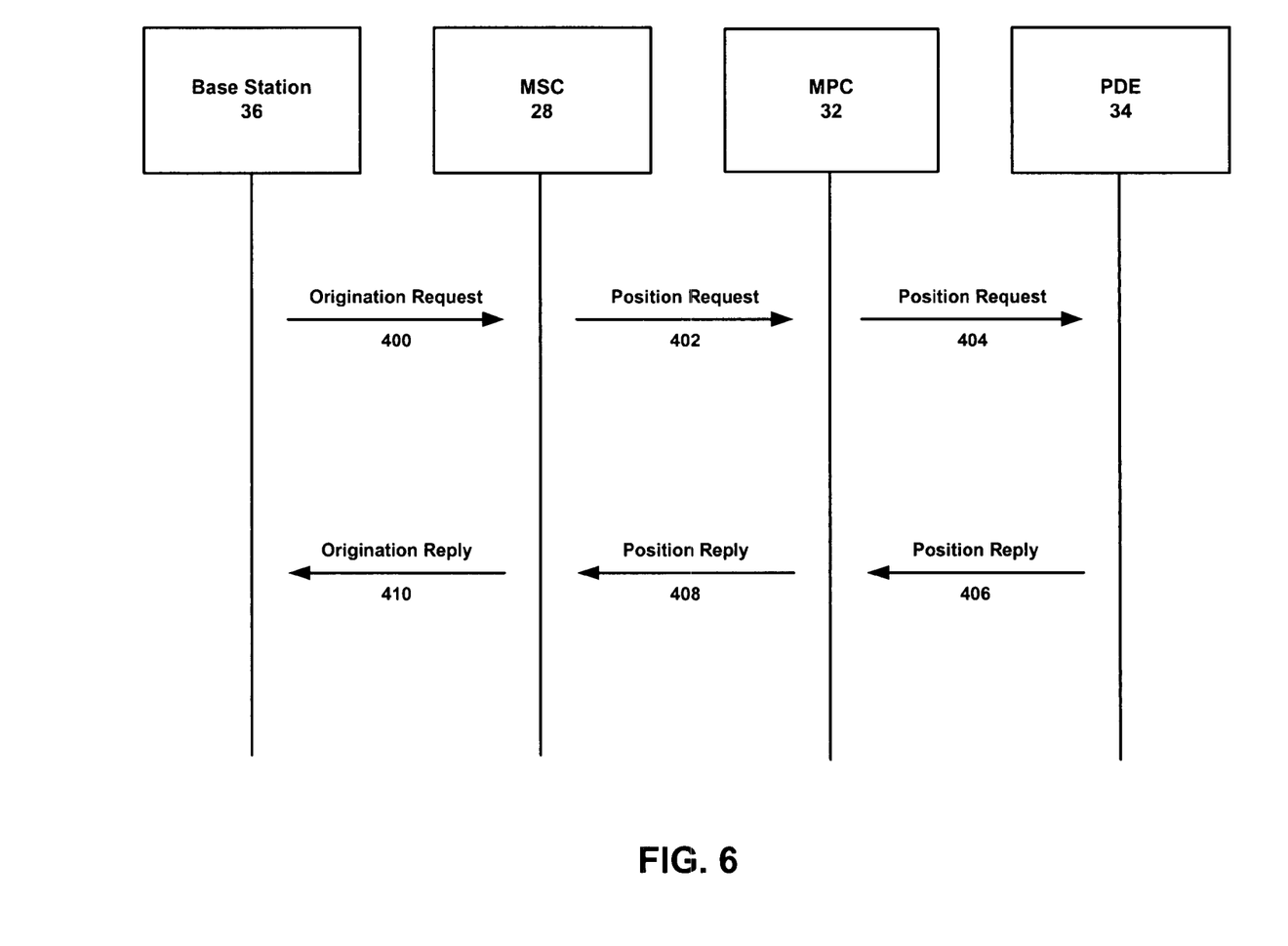
FIG. 6 illustrates generally signaling between a base station, MSC, mobile positioning center (MPC), and PDE to determine the location of the mobile station.

FIG. 6 illustrates generally the signaling between the base station 36, MSC 28, MPC 32, and PDE 34 to cause the PDE 34 to determine and transmit to the base station 36 the location of the mobile station 12.

At step 400, the base station 36 may send an origination request to the MSC 28. The origination request may be sent to the MSC 28 in response to determining that a call-drop event occurred. The origination request may indicate to the MSC 28 to provide the location of a mobile station. As such, the origination request may identify, for example, by an IP address or mobile identification number (MIN), the mobile station whose location is requested.

The MSC 28 may store, for instance, the location of the base station 36 that serves the mobile station 12. In response to receiving the origination request, at step 402, the MSC 28 may send a position request to the MPC 32. The position request may identify the base station that serves the mobile station 12 and the mobile station whose location is required. The signaling may result in the MPC 32 forwarding the position request to the PDE 34 at step 404, and the PDE 34 responsively determining the location of the mobile station. The PDE 34 may determine the location of the mobile station 12 through methods well-known to those skilled in the art. For instance, IS-801, the contents of which is herein incorporated by reference in its entirety, may define methods that correlate the location of the base station 36 that serves the mobile station 12 with a PN offset to determine the location of the mobile station 12. The PDE 34 may return back to the MPC 32, a position reply, at step 406. The position reply may define the location of the mobile station. At step 408, the MPC 32 may forward to the MSC the position reply. In turn, at step 410, the MSC 28 may send to the base station 36 an origination reply. According to the exemplary embodiments, the location returned by the origination reply may be the call-drop location.

As noted above, FIG. 6 illustrates generally the process for the base station 36 to query network entities to obtain the location of the mobile station. J-STD-036, published by the Telecommunication Industry Association (TIA) and the contents of which are herein incorporated by reference in its entirety, describe in more detail the signaling between the base station 36, MSC 28, MPC 32, and/or PDE 34 to obtain the location of the mobile station. J-STD-036 deals with position determination in the context of emergency services. The exemplary embodiments of the present invention should not be limited by which entities, for example, MSC 28, MPC 32, or PDE 34, the base station 36 signals to obtain the location of the mobile station 12. For instance, the base station 36 could directly signal the PDE 34 for the location of the mobile station 12. Additionally, the base station, itself, may be programmed with capability to determine the location of the mobile station, itself.

In the exemplary embodiments described above, the mobile station 12 or base station 36 can determine whether the call-drop event occurred by comparing a duration of bad frames to the threshold level. The threshold level will preferably be duration of bad frames above typical durations so that the duration of bad frames above the threshold level is indicative of a call-drop event. In this regard, the threshold level could be set at a fixed level for some or all of the mobile stations. Alternatively, the threshold level could be determined adaptively for some or all of the mobile stations. The particular details of how to establish the threshold level are not necessarily critical to the exemplary embodiments of the present invention.

Further, any of a variety of entities can establish the threshold level. For instance, the BSC 16 could establish the threshold level. Additionally, the BSC 16 could report the threshold level to the mobile station 12. For instance, the BSC 16 could send an indication of the threshold level to the mobile station 12 in a user-definable field over an air interface paging channel. Alternatively, the mobile station 12, itself, could establish the threshold level.

Exemplary embodiments of the present invention have been described above. Those skilled in the art will understand, however, that changes and modifications may be made to this embodiment without departing from the true scope and spirit of the present invention, which is defined by the claims.

We claim:

1. In a wireless communication system in which a mobile station engages in a call via air interface communication with a base station, a method comprising:

the base station making a determination that the call has been dropped; and responsive to the base station making the determination that the call has been dropped, determining a call-drop location of the mobile station, wherein making the determination that the call in which the mobile station was engaged has been dropped comprises determining, at the base station, that a duration of bad frames received on a reverse traffic channel (RTCH) carrying communications from the mobile station to the base station is greater than a threshold level, wherein the base station determines that no call-drop event has occurred if a duration of good frames are received at the base station from the mobile station within a predefined period of time after receiving the duration of bad frames, wherein the wireless communication system comprises position determining equipment (PDE); and wherein determining the call-drop location comprises the base station sending a position request to the PDE to determine the location of the mobile station, the position request including a mobile identification number (MIN) identifying the mobile station.

2. The method of claim 1, wherein the mobile station is communicatively coupled a network entity over the air interface, the method further comprising storing the call-drop location in the network entity.

3. The method of claim 1, wherein making the determination that the call in which the mobile station was engaged has been dropped comprises the base station determining that the call cannot be handed off to another cell-site.

4. A system comprising:

a mobile station;

a base station communicatively coupled to the mobile station;

wherein the mobile station is arranged to engage in a call over an air interface; and wherein the base station is arranged to:

(i) make a determination that the call in which the mobile station was engaged has been dropped by determining that a duration of bad frames received on a reverse traffic channel (RTCH) carrying communications from the mobile station to the base station is greater than a threshold level, wherein the base station determines that no call-drop event has occurred if a duration of good frames are received at the base station from the mobile station within a predefined period of time after receiving the duration of bad frames; and (ii) responsive to making the determination that the call in which the mobile station was engaged has been dropped, cause position determining equipment (PDE) to determine a call-drop location of the mobile station.

5. The system of claim 4, wherein the threshold level is twenty bad frames.

6. The system of claim 4, wherein the base station comprises memory; and wherein the base station is further arranged to store the call-drop location in the memory to thereby log locations of call drop events.

7. The system of claim 4, wherein the base station being arranged to make the determination that the call in which the mobile station was engaged has been dropped comprises the base station being arranged to make the determination that the call cannot be handed off to another a cell-site.

8. A base station comprising:

a first routine to make a determination that a call in which a mobile station was engaged has been dropped by determining that a duration of bad frames received on a reverse traffic channel (RTCH) carrying communications from the mobile station to the base station is greater than a threshold level, wherein the base station determines that no call-drop event has occurred if a duration of good frames are received at the base station from the mobile station within a predefined period of time after receiving the duration of bad frames; and a second routine to cause position determining equipment (PDE) to determine a call-drop location of the mobile station in response to the first routine making the determination that the call in which the mobile station was engaged has been dropped.

* * * * *